US007903103B2

(12) United States Patent
Osterberg et al.

(10) Patent No.: US 7,903,103 B2
(45) Date of Patent: Mar. 8, 2011

(54) REUSABLE POSTER HOLDER AND METHODS FOR DISPLAY

(75) Inventors: Douglas L. Osterberg, Menasha, WI (US); Peter Thomas Herdman, Buckinghamshire (GB)

(73) Assignee: Appleton Coated, LLC, Kimberly, WI (US)

( * ) Notice: Subject to any disclaimer, the term of this patent is extended or adjusted under 35 U.S.C. 154(b) by 1073 days.

(21) Appl. No.: 11/651,462

(22) Filed: Jan. 10, 2007

(65) Prior Publication Data

US 2007/0159473 A1 Jul. 12, 2007

Related U.S. Application Data

(60) Provisional application No. 60/757,874, filed on Jan. 11, 2006.

(51) Int. Cl.
*G06F 3/038* (2006.01)

(52) U.S. Cl. .......................... 345/204; 40/642.02; 40/700

(58) Field of Classification Search .................. 345/204; 40/530, 537, 642.02, 790–793, 700
See application file for complete search history.

(56) References Cited

U.S. PATENT DOCUMENTS 4,702,025 A 10/1987 Mace
5,138,780 A * 8/1992 Kunkel .......................... 40/765
5,215,285 A * 6/1993 Lewis .......................... 248/457
5,408,774 A * 4/1995 Grewe et al. .............. 40/606.15
5,630,546 A * 5/1997 Velch ...................... 229/125.37
5,987,794 A * 11/1999 Lavi et al. ................. 40/611.04
6,231,196 B1 * 5/2001 Mahachek .................... 359/838
6,365,686 B1 * 4/2002 Jacobs et al. ................. 526/127
6,753,830 B2 6/2004 Gelbman
6,962,016 B1 * 11/2005 Meyer ............................ 40/757
6,990,293 B2 * 1/2006 Hu ................................ 396/311
7,007,595 B2 3/2006 Ozery et al.
2002/0055938 A1 5/2002 Matsuo et al.
2002/0139025 A1 * 10/2002 Pitcher et al. .................. 40/611
2007/0109261 A1 * 5/2007 Omi et al. .................... 345/156
2008/0055240 A1 3/2008 Zhang
2008/0115395 A1 * 5/2008 Saito et al. ...................... 40/564

FOREIGN PATENT DOCUMENTS

WO WO-2005/052898 A2 6/2005

* cited by examiner

*Primary Examiner* — Kimnhung Nguyen
(74) *Attorney, Agent, or Firm* — Muncy, Geissler, Olds & Lowe, PLLC

(57) ABSTRACT

A poster holder having a first member, a second member moveable away from the first member to an open position and moveable towards the first member to a closed position, the second member cooperating with the first member to secure the substrate in the closed position, a controller configured to selectively energize at least one portion of an energizeable image on a substrate detachably securable between the first member and the second member in the closed position, and an electrical power source connected to the controller. The poster holder is useable in a display that includes a poster formed of a substrate and an energizeable image formed thereon. Methods of displaying an energizeable image using the poster holder are set forth.

23 Claims, 11 Drawing Sheets

REUSABLE POSTER HOLDER AND METHODS FOR DISPLAY

CROSS REFERENCE TO RELATED APPLICATIONS

This application claims the benefit of U.S. Provisional Application No. 60/757,874, filed Jan. 11, 2006, and is herein incorporated by reference

BACKGROUND OF THE INVENTION

1. Field of the Invention

The present invention is directed to reusable poster holders for electronic displays. In particular, the poster holder can be used with a substrate having an energizeable image thereon, such as a conductive ink forming the energizeable image. The poster holder holds the substrate and provides a connection for controlling and powering at least one portion of the energizeable image.

2. Description of Related Art

Various illuminatable displays are known. Traditional electronic display technologies utilize rigid flat panel designs. These traditional display designs utilize permanent or semi-permanent connections to connect the electrical power source to the display itself, such as soldered metal, conductive glue, various male-female insert arrangements, etc., that cooperate with abrasion-resistant leads on the display itself.

Developing technologies aim to provide thin printed display designs, generally less durable that traditional rigid displays and less than 3 millimeters in thickness but not limited to, some of which are rigid, some are flexible, some of which use flexible paper substrates, and some of which use plastic substrates. In developing thinner displays, several technologies, such as but not limited to printed conductive inks, various bistable encapsulated electrophoretics, electrochomic, electrowetting, and electroluminescent chemistries have been utilized. Some displays use on-substrate electrical/electronic switching with various devices or transistor chips or circuits. Some displays use on-substrate electrical power supplies in the form of printed or attached batteries. Some displays use off-substrate electrical power supplies and/or electrical/electronic switching. Some displays utilize printed conductive inks that do not afford the abrasion resistance of traditional designs and traditional electrical connections, which were, for example, materials like etched metals or conductive polymers.

The contents of both U.S. Pat. No. 6,753,830 to Gelbman and U.S. patent application Ser. No. 11/346,180 are hereby incorporated by reference. In these disclosures, different types of displays are discussed. These displays may be on a paper substrate, but the substrate could also be plastic, paper board, metals, non-metals, ceramic, pulp-based products such as paper, cardboard and cloth, as well as combinations of various materials.

While there are many different techniques for providing illuminated displays on substrates, a reliable means for energizing and holding the substrates has not been provided. The present invention provides a poster holder that is configured to energize and hold the substrates in a reliable manner and further details of the poster holder are described below.

BRIEF SUMMARY OF THE INVENTION

According to principles of this invention, a poster holder is provided that can cooperate with a substrate to energize and/or program at least one portion of an energizeable image thereon and to detachably secure the substrate within the poster holder without adversely abrading the conductive leads on the substrate and without functionally or physically altering or damaging the poster in any way.

In particular, the poster holder includes a first member, a second member moveable away from the first member to an open position and moveable towards the first member to a closed position, the second member cooperating with the first member to secure the substrate in the closed position, a controller configured to selectively energize at least one portion of an energizeable image on a substrate detachably securable between the first member and the second member in the closed position, and an electrical power source connected to the controller.

The poster holder may also include one or more of the following features including a biasing mechanism that presses the second member towards the closed position, a retaining mechanism that holds the second member in the closed position, and a power interrupt device configured to interrupt flow of electricity to the energizeable image when the second member is moved out of the closed position.

In addition, the controller may be configured to receive instructions from a program stored in a memory device, such as, but not limited to, a memory stick or memory card, data entered via a keypad connected to the controller, a reader that reads instructions from an integrated chip that is separate or attachable to a substrate, a reader that reads instructions from a code that is imprintable on a substrate, or via a direct or wireless connection to a computer.

The controller may also be configured to respond to signals from a sensor and thereafter issue a command to energize a selected portion of an energizeable image, the sensor including at least one of a thermometer for detecting temperature, an ambient light detector, a detector for sensing location, a noise detector for detecting sound, an infrared sensor, a vibration sensor, a timer, a switch, and a radio wave, acoustic, or other proximity sensor.

According to principles of the invention, a display can be provided that includes a poster holder as set forth above and also includes a poster secured between the first and second members. The poster is formed of a substrate and at least one energizeable image is formed on the substrate.

The poster holder of the display may also include one or more of the following features including a circuit board supported by the second member and in communication with the controller to selectively energize at least one portion of the at least one energizeable image, a locking mechanism to lock the at least one poster in the display, the poster being replaceable with another poster having at least one energizeable image thereon, or a plurality of posters that are removable from the poster holder.

The poster holder may be configured to secure the poster in the closed position and to subsequently release the poster in the open position without having altered or degraded the functional or physical features of the poster.

According to principles of the invention, a method for displaying at least one energizeable image on at least one poster is described. The method includes placing at least one poster having the at least one energizeable image between a first member and a second member of a poster holder, closing the second member of the poster holder to secure the at least one poster between the first and second members of the poster holder, providing a controller for the at least one poster, the controller being configured to selectively energize at least one portion of the at least one energizeable image, and supplying electricity to the controller, whereafter the controller energizes the at least one portion of the at least one energizeable image.

The method may also include interrupting flow of electricity to the energizeable image when the second member is not in the closed position.

Furthermore, according to an aspect of the method, the controller selectively energizes the at least one portion of the at least one energizeable image based on a program run by the controller and changing the program run by the controller by providing a different program stored in a memory device, such as, but not limited to, a memory stick or memory card, by selecting a different program via a keypad connected to the controller, reading instructions from an integrated chip that is separate or attached to a substrate, reading instructions from a code imprinted on the substrate, receiving instructions via a direct or wireless connection to a computer, or other input device.

The controller may also selectively energize the at least one portion of the energizeable image based on signals from a sensor detecting at least one of temperature, level of ambient lighting, change in location, sound, an infrared signal, vibration, an elapsed period of time, activation of a switch, and activation of a radio wave, acoustic, or other proximity sensor.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

Various displays are known. The material for these displays has been discussed above. It is contemplated that an energizeable image can be placed on a substrate and that the substrate may be either flexible or stiff. In order to hold, control and/or power at least one portion of the energizeable image on the substrate, the present displays and poster holders are provided.

Figure 2:
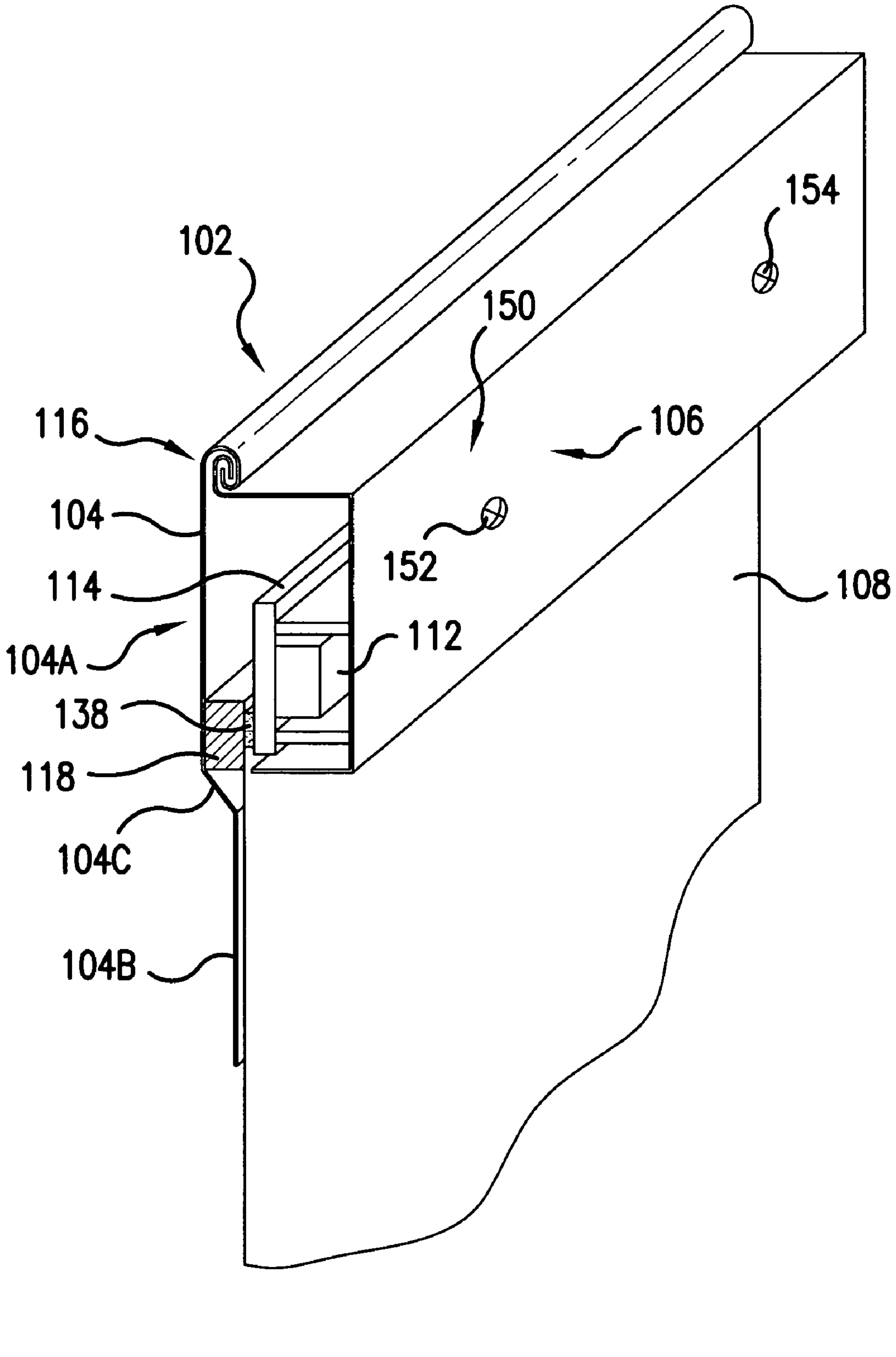
FIG. 2 is schematic view of the display and poster holder shown in FIG. 1.
Figure 3:
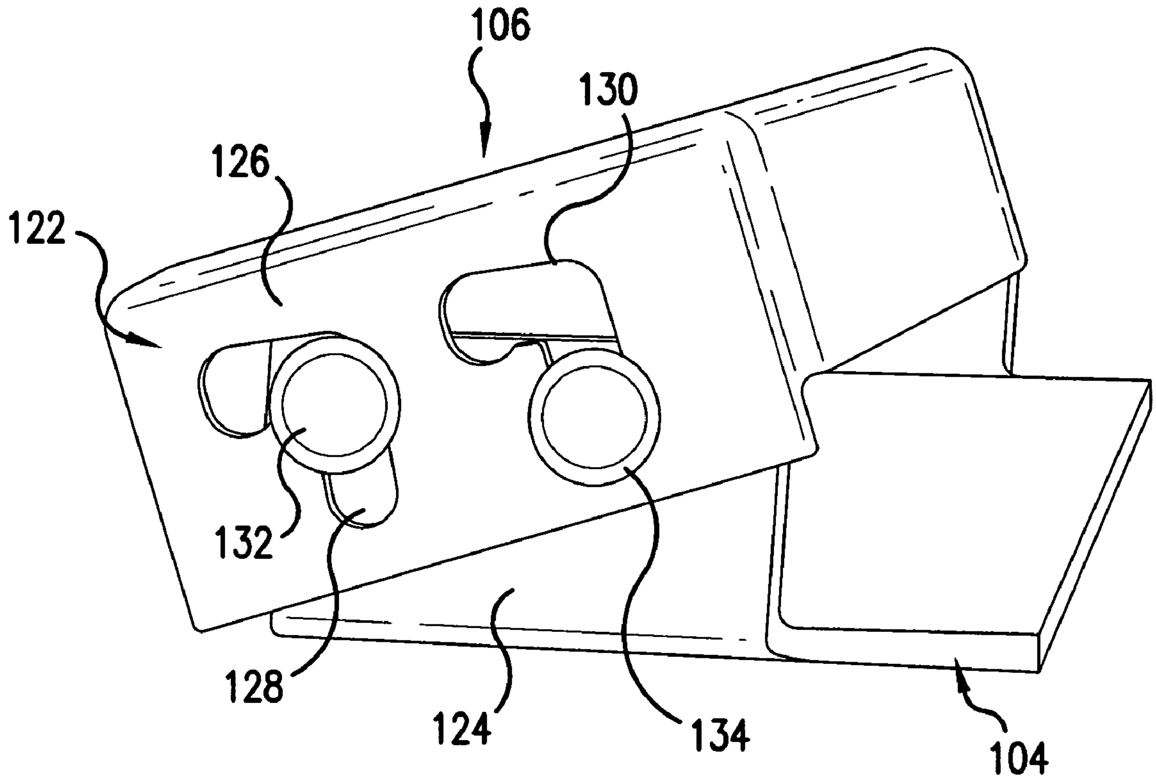
FIG. 3 is a side view of the poster holder of FIG. 1 in an open position without the poster inserted therein.
Figure 4:
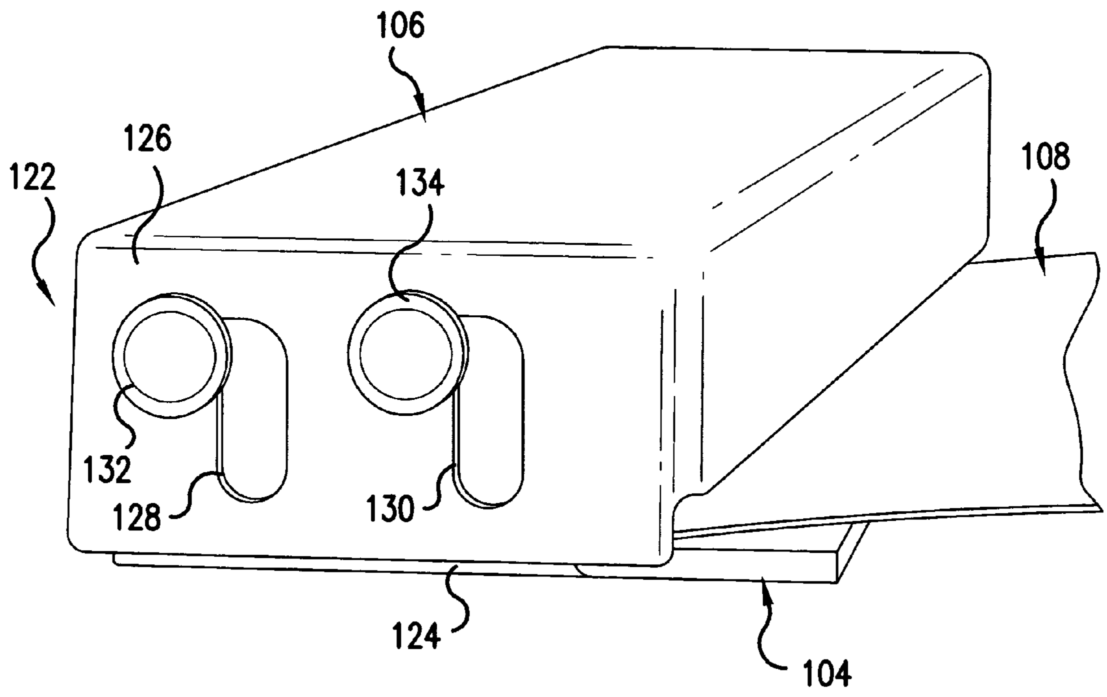
FIG. 4 is a side view of the poster holder of FIG. 1 in closed position with a poster inserted therein.

As seen in FIGS. 1-6, a first exemplary embodiment of a display 100 and corresponding poster holder 102 are provided. The poster holder 102 includes a first member 104 and a second member 106 that are arranged such that second member 106 is moveable away from the first member 104 to an open position (FIG. 3) and moveable towards the first member 104 to a closed position (FIG. 4). The second member 106 can cooperate with the first member 104 to secure a poster, the poster being formed of a substrate 108 and an energizeable image, such as a self-illuminable image 110, located thereon, in the closed position. The first member 104 includes a first portion 104A and a second portion 104B and is arranged such that the second member 106, in the closed position, substantially covers the first portion 106A and the second portion 104B supports at least a portion of the substrate 108. The first member may also include a bent portion 104C between the first and second portions 104A, 104B causing the second portion 104B to be elevated with respect to the first portion 104A to further support the substrate 108. Although the first member 104 has been shown with a second and third portion 104B, 104C that supports the substrate 108, these portions may be eliminated to provide a free hanging substrate.

As best seen in FIG. 2, a controller 112 is provided inside the poster holder 102. In this particular embodiment, the controller 112 is mounted on a circuit board 114, which is attached to the second member 106. Alternatively, the controller 112 could be mounted or supported by the first member 104. The controller 112, via the circuit board 114, is configured to selectively energize at least portions of the self-illuminable image 108 on substrate 106 when the substrate 106 is secured between the first and second members 102, 104. Alternatively, the controller 112 may be provided outside the poster holder 102 for easier access.

While the controller 112 has been described as activating at least portions of the self-illuminable image 108, the controller 112 could also activate just a single portion of the self-illuminable image 108 or the entire image. Great control is available with the holder of the present invention. For example, various lighting effects such as sequential flashing, lights running around the boarder, or complete illumination can be controlled by the controller 112.

The poster holder 102 may include a biasing mechanism 116 that assists in pressing the second member 106 towards the first member 104. The biasing mechanism 116 may be a spring-loaded hinge connecting the second member to the first member. Alternatively, the first and second members 104, 106 may be pivotally joined using conventional means and a separate biasing mechanism may be provided to assists in pressing the second member 106 towards the first member 104.

A cushion member 118 is attached to the first member 104, which assists in holding the substrate 108 between the first and second members 104, 106. The cushion member 118 may be made of foam or other material that is compressible so as to avoid damage to the substrate 108 while it is secured between the first and second members 104, 106.

Figure 1:
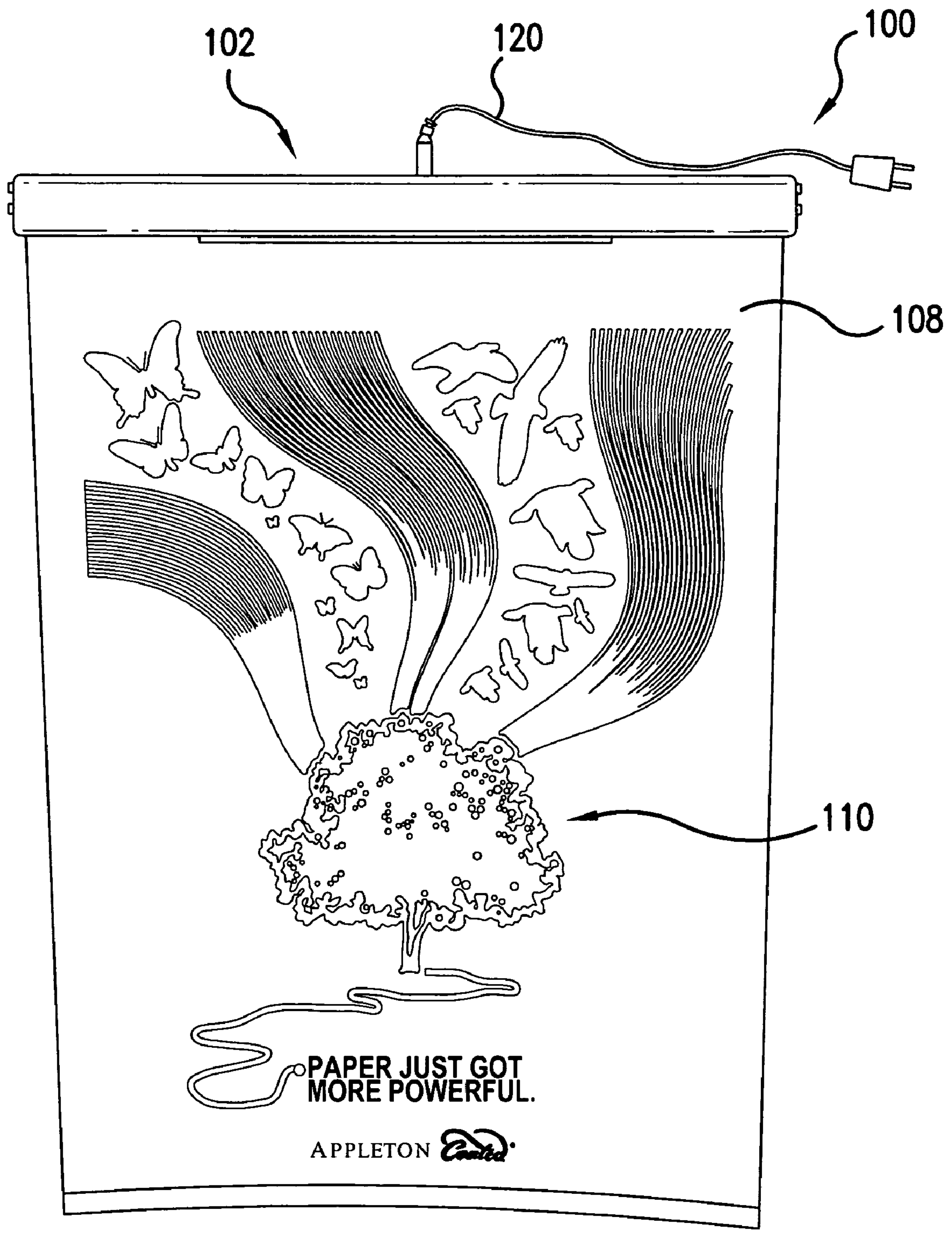
FIG. 1 is a front view of a display and poster holder according to a first exemplary embodiment.

An electrical power source 120 is connected to the controller 112. While the electrical power source 120 is shown in FIG. 1 as a detachable plug coupled to the controller 112, the electrical power source could also be a battery. The electrical power source 120 may feed direct current to a power inverter that converts this to the appropriate voltage and frequency alternating current necessary to excite the phosphor materials into their illuminating state on the substrate 106. Alternatively, AC current may be transformed from typical standard voltage and frequency such as 120V through 60 HV in the United States, for example, into the appropriate levels for illuminating the self-illuminable image 108. Of course, whatever the typical local voltage and frequency, the poster holder 102 can be designed to accommodate this. Thus, different voltages and frequencies are widely variable as desired.

In addition to the biasing mechanism 116 described above, the poster holder 102 may also include a retaining mechanism 122 that holds the second member 106 in the closed position. As seen in FIGS. 3 and 4, the first member 104 includes a first flange portion 124 and the second member 106 includes a second flange portion 126. The retaining mechanism 122 includes a pair of slots 128, 130 formed in the second flange portion 126 and a pair of posts 132, 134 formed on the first flange portion 124. The posts 132, 134 are slidable within the corresponding slots 128, 130 as the second member 106 moves between the closed and open position. While the first embodiment has been shown with a plurality of posts and slots, it is understood that a single slot and post may be provided. In addition, the locations of the slots and posts could be reversed so that the slots are formed in the first flange portion 124 and the posts are formed on the second flange portion 126. Of course, the posts and slots could be entirely omitted.

As also shown in FIG. 2, a locking mechanism 150 to lock substrate 108 in the display 100 can be provided. In the first embodiment shown, the locking mechanism 150 includes a pair of spaced apart fasteners 152, 154, such as snap locks, screws, or other fasteners, that penetrate the second member 106 and the substrate 108. Preferably, the substrate 108 includes a pair of spaced apart holes (not shown) that correspond to the spaced apart fasteners 152, 154. Many other locking mechanisms can be provided, such as, detents formed on the second member provided in registration with corresponding holes on a substrate to further secure the substrate within the poster holder 102.

Figure 5:
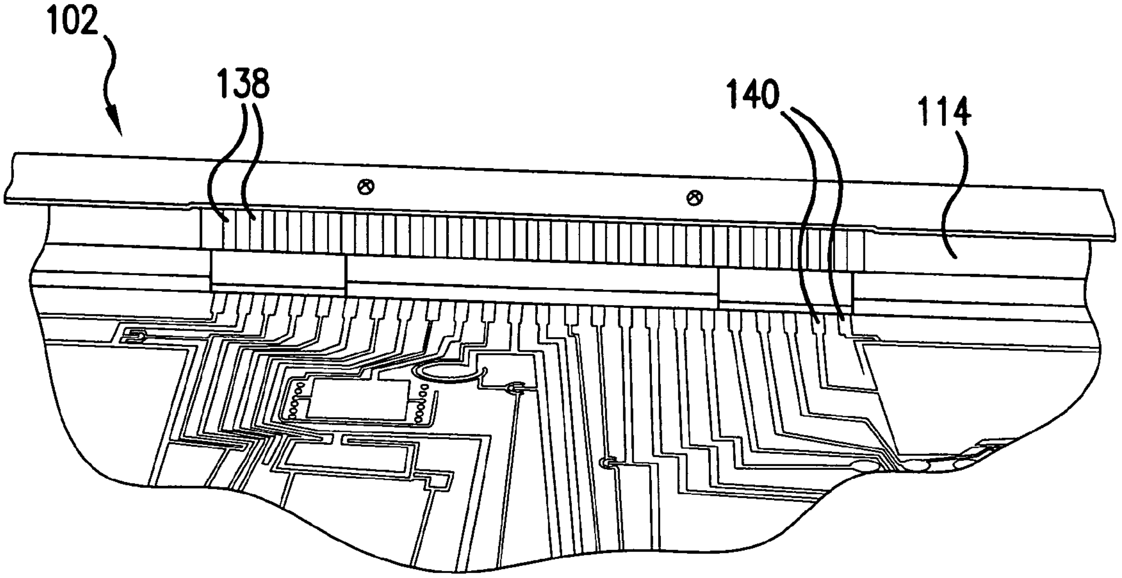
FIG. 5 is a front view of the poster holder of FIG. 1 in an open position.

FIG. 5 shows the poster holder 102 in the open position with the circuit board 114 exposed. A plurality of contacts 138 is provided. Each pair of contacts 138 cooperates with a pair of leads 140 along the top edge of the 108 substrate to complete a circuit on the substrate 108 in order to illuminate the self-illuminable image 110, as explained in U.S. Provisional Application 60/649,536. As seen in FIG. 5, there are twenty-four contacts to form twelve circuits, although any number of contacts may be provided.

When in the closed position, these contacts 138 engage the leads 140 on the substrate 108 and therefore complete the circuit. In addition, the controller 112 selectively activates the appropriate connectors to illuminate the self-illuminable image 110. As a result, the controller can cause various portions of the self-illuminable image 110 to illuminate, to flash, or to change the image being shown.

Figure 6:
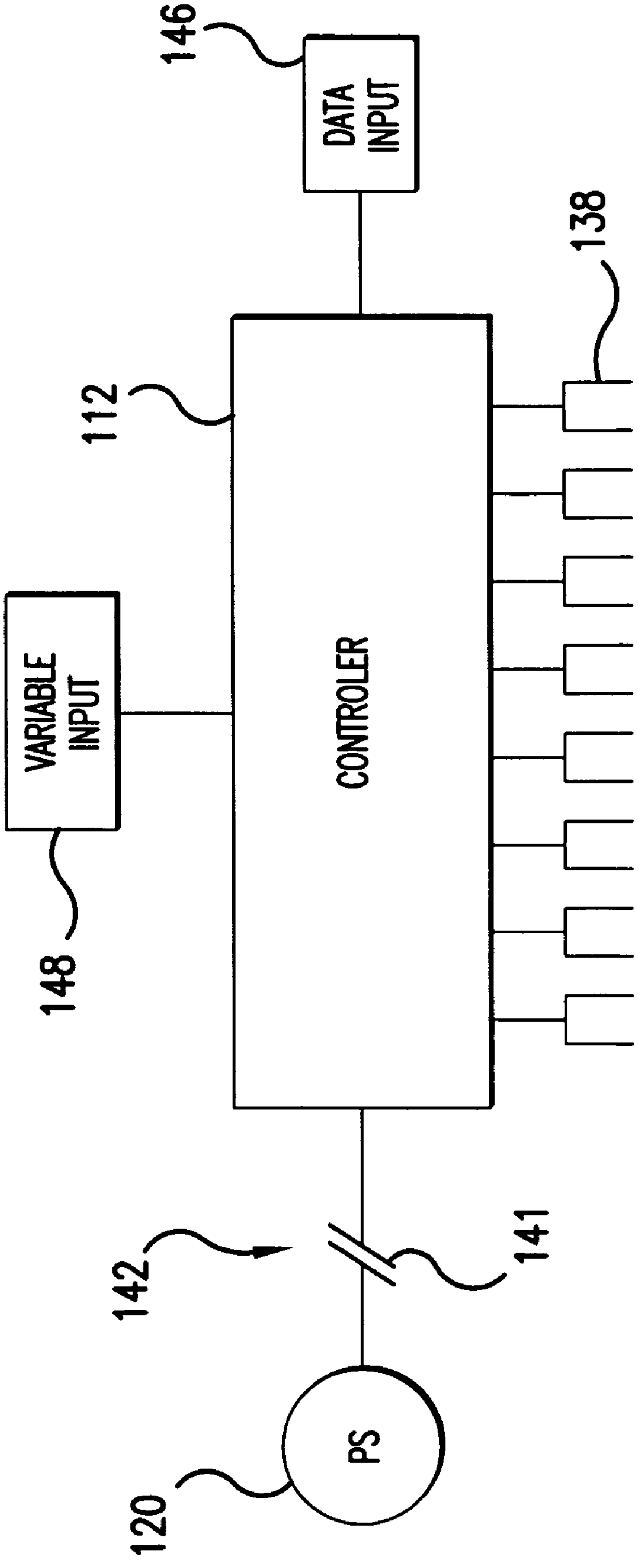
FIG. 6 is a schematic of the display of FIG. 1.

As seen in FIG. 6, the electrical power source 120 can include a power interrupt device 142 that interrupts flow of electricity to the self-illuminable image when the second member 106 is moved out of the closed position. For example, the power interrupt device 142 includes a switch 144 that is opened when the second member 106 is moved out of the closed position. While the switch 144 is shown as being located between the electrical power source 120 and the controller 112, the switch can also be placed downstream from the controller. Alternatively, the power interrupt device could include an additional circuit formed on a substrate, such as a printed connector that cooperates with two leads from the controller, such that the self-illuminable image 110 cannot be energized unless the second member 106 is in the closed position.

It is known that image intensity declines over time with electroluminescent materials. Therefore provision may be included in the controller to adjust the voltage and/or frequency over time to maintain the illumination intensity or simply to change it for a brighter image. Alternatively, these parameters may also be decreased so as to extend the useful life of the display. In addition, because the poster holder may be reused for different self-illuminable images and substrates, the voltage and/or frequency may be adjusted simply to accommodate the different designs' electrical requirements.

While the controller 112 can execute a program stored in memory to control the selective activation of the self-illuminable image, new programs or instructions can be uploaded via a data input device 146. For example, the controller can receive instructions from a program stored in a memory device, such as, but not limited to, a memory stick or memory card, data entered via a keypad connected to the controller, a reader that reads instructions from an integrated chip that is separate or attachable to a substrate, a reader that reads instructions from a code that is imprintable on a substrate via the data input device 146, or via a direct or wireless connection to a computer. By further way of example, but not limited to, the memory stick or memory card may take the form of a SD, a XD, or a microdrive.

The controller 112 can also respond to signals from a sensor 148 and thereafter issues a command to energize a selected portion of the self-illuminable image 110 in response to changes in the environment. For example, the sensor 146 may be a thermometer for detecting temperature, an ambient light detector, a detector for sensing location, a noise detector for detecting sound, an infrared sensor, a vibration sensor, a timer, a switch, and a radio wave, acoustic, or other proximity sensor. In addition, more that one sensor may be provided. As a result of the sensor or sensors, the entire self-illuminable image 110 on substrate 108 or only segments thereof can be switched on, switched off, or both switched on and off in response to signals from these sensors.

The poster holder 102 is suitable for many different applications and environments. For example, because the electrical power source 120 can be a battery, the poster holder 102 can be portable or otherwise mounted on a moveable object, such as taxis, delivery trucks, buses, or other appropriate vehicles. Because the poster holder 102 may have a detector for sensing location, such as a GPS sensor, the self-illuminable image 108 can be used to display different messages or pictures depending on the location. For example, if a restaurant wanted to advertise in a particular portion of the city, the poster holder 102 can be used to provide the appropriate information for that location.

In addition, the other sensors that are responsive to the external environment can be used to display different images depending on the current conditions, independent of location of the poster holder 102. For example, if the ambient temperature exceeds a certain set temperature, an advertisement for a refreshing drink or a restaurant could be displayed. Depending on the amount of light or the time of day, the poster holder 102 can either change displays or turn-off the display to conserve energy. If the display is off, a noise or a movement near the poster holder 102 can cause the poster holder 102 to illuminate at least one portion of the self-illuminable image 108. The poster holder 102 can even be activated by a remote transmitting of an infra-red signal. It is contemplated that there are many different ways the poster holder 102 can be responsive to a signal received by a sensor and that many different sensors can be provided in any combination as is desired for controlling the illumination of the self-illuminable image 108.

While the above poster holder 102 has been described with respect to a single substrate 108 having a self-illuminable image imprinted thereon, the poster holder can be sized to accommodate a plurality of substrates with the same or different self-illuminable images thereon.

Having described the display 100 and poster holder 102, a method for displaying at least one self-illuminable image on a poster will be described. The method includes first placing at least one substrate 108 having at least one self-illuminable image 110 between the first member 104 and the second member 106 of the poster holder 102. Next, the second member 106 is closed to secure the substrate 108 between the first and second members 104, 106 of the poster holder 108. Then, electricity is supplied to the controller 112 and thereafter the controller 112 energizes selected portions of the self-illuminable image 110.

The controller 112 selectively energizes portions of the self-illuminable image 110 based on a program run by the controller 112. The program run by the controller can be changed by providing a different program stored in a memory device, such as, but not limited to, a memory stick or memory card, by selecting a different program via a keypad connected to the controller, reading instructions from an integrated chip that is separate or attachable to a substrate, reading instructions from a code imprinted on the substrate, or via a direct or wireless connection to a computer.

Figure 7:
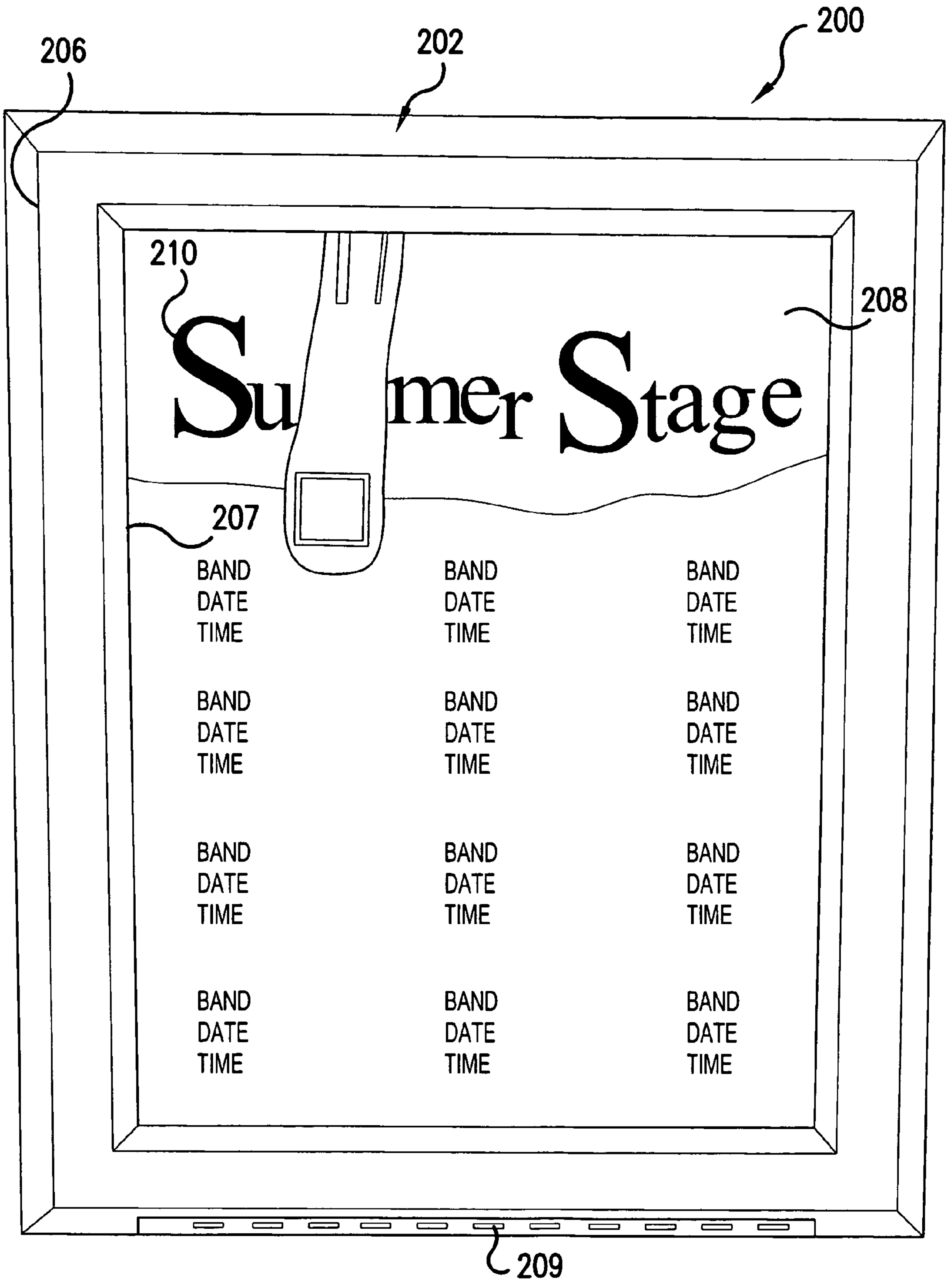
FIG. 7 is a front view of a display and poster holder according to a second exemplary embodiment.
Figure 8:
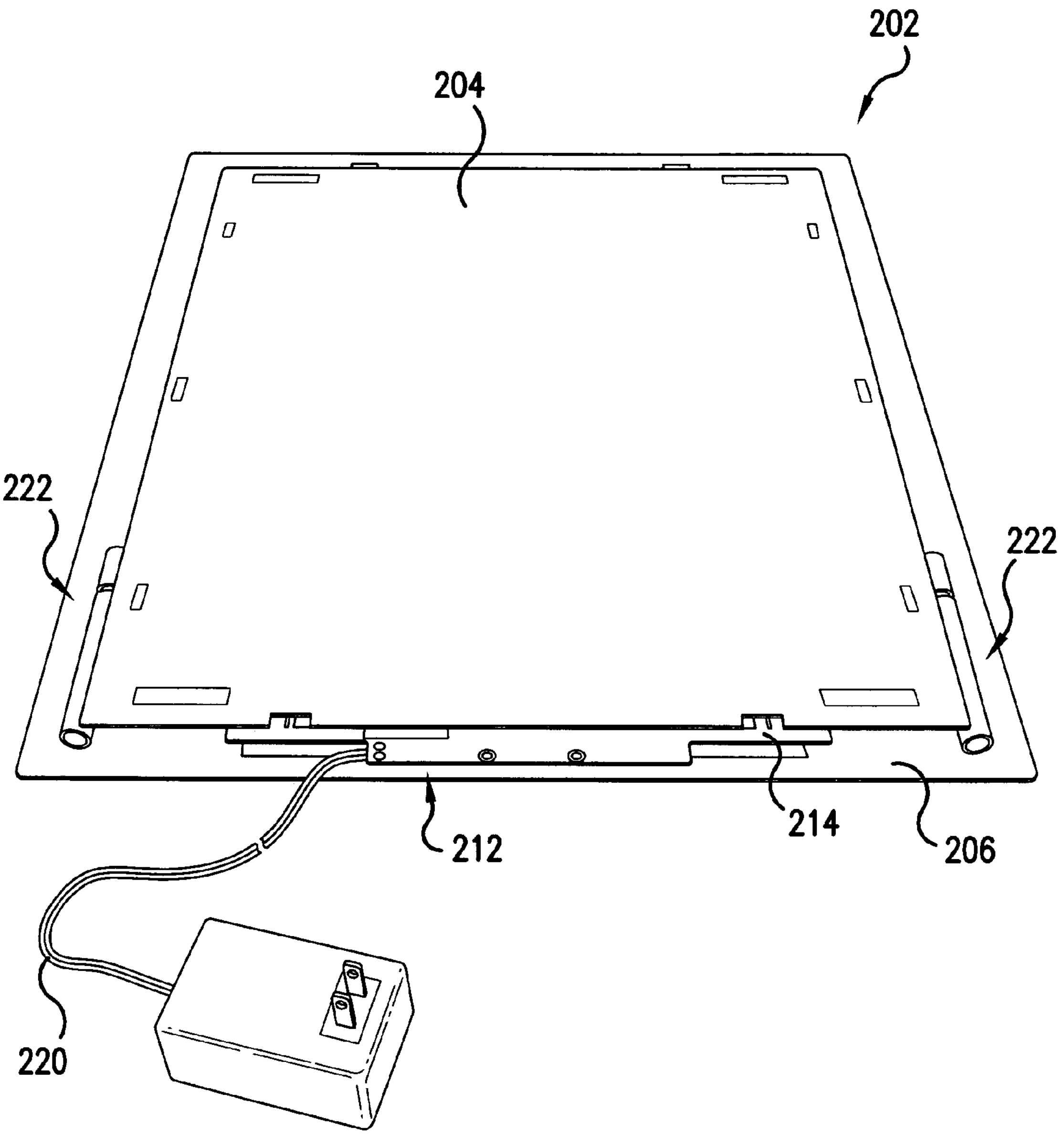
FIG. 8 is a rear view of the poster holder of FIG. 7 in a closed configuration.
Figure 9:
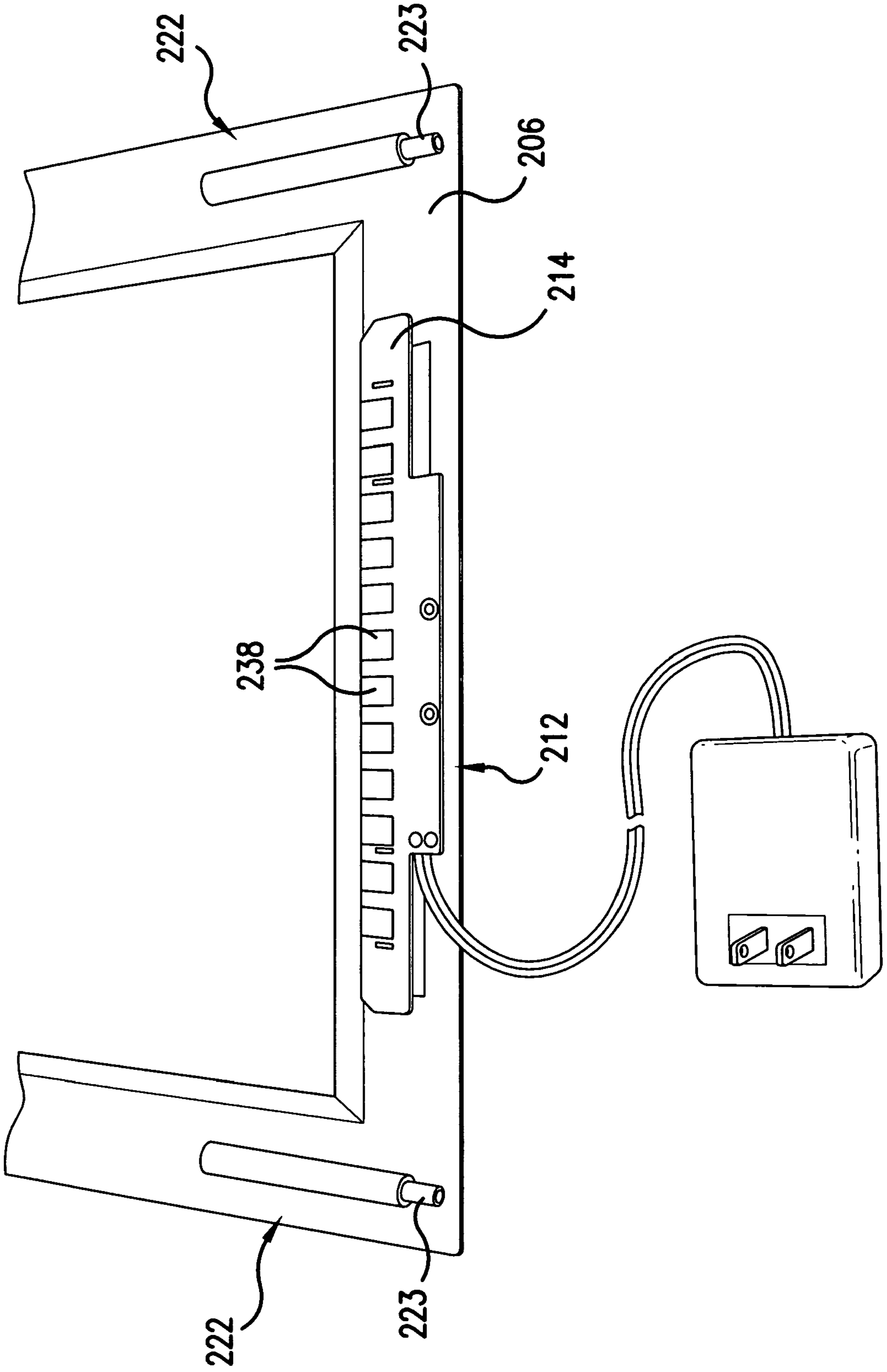
FIG. 9 is a rear view of the poster holder of FIG. 7 in an open configuration without the poster inserted therein.

A second exemplary embodiment of a display 200 and corresponding poster holder 202 is shown in FIGS. 7-9. In this embodiment, the poster holder 202 is formed in the shape of a frame. In particular, the first member 204 corresponds to the back of the frame and the second member 206 is a face of the frame. The second member 206 has an opening 207 therein that allows a self-illuminable image 210 formed on a substrate 208 to be visible therethrough. The second member 206 is pivotally attached to the back via a hinge 209.

The hinge 209 may be similar to the biasing mechanism described above or may simply be a conventional hinge. Moreover, because the second member surrounds the substrate 208, many different conventional means for securing the first member to the second member may be provided.

FIGS. 8 and 9 show rear views of the display 200 with the second member 206 in a closed and open position, respectively. In this particular embodiment, the controller 212, the circuit board 214, and the plurality of contacts 238 are shown as attached to the rear surface of the second member 206. It is understood that the controller 212 and/or the circuit board 214 may be placed on a front surface of the first member 204. In addition, while the controller 212 has been shown as being arranged between the first and second members 204, 206, the controller 212 can also be located external to the poster holder 202. Such arrangements have been described above.

An electrical power source 220 is connected to the controller 212. While the electrical power source 220 is shown in FIGS. 8 and 9 as a detachable plug coupled to the controller 212, the electrical power source could also be a battery as described above.

The poster holder 202 also includes a retaining mechanism 222 to help retain the second member 206 in the closed position. In the particular embodiment shown in FIGS. 8 and 9, the retaining mechanism includes a pair of displaceable pins 223 that move into engagement with the first member 204 when the second member 206 is moved into the closed position.

The controller 212 operates in a similar manner as described above for the first embodiment. Furthermore, the display 200 can include a sensor and a data input device similar to those described above for the first embodiment as shown in FIG. 6.

Figure 10:
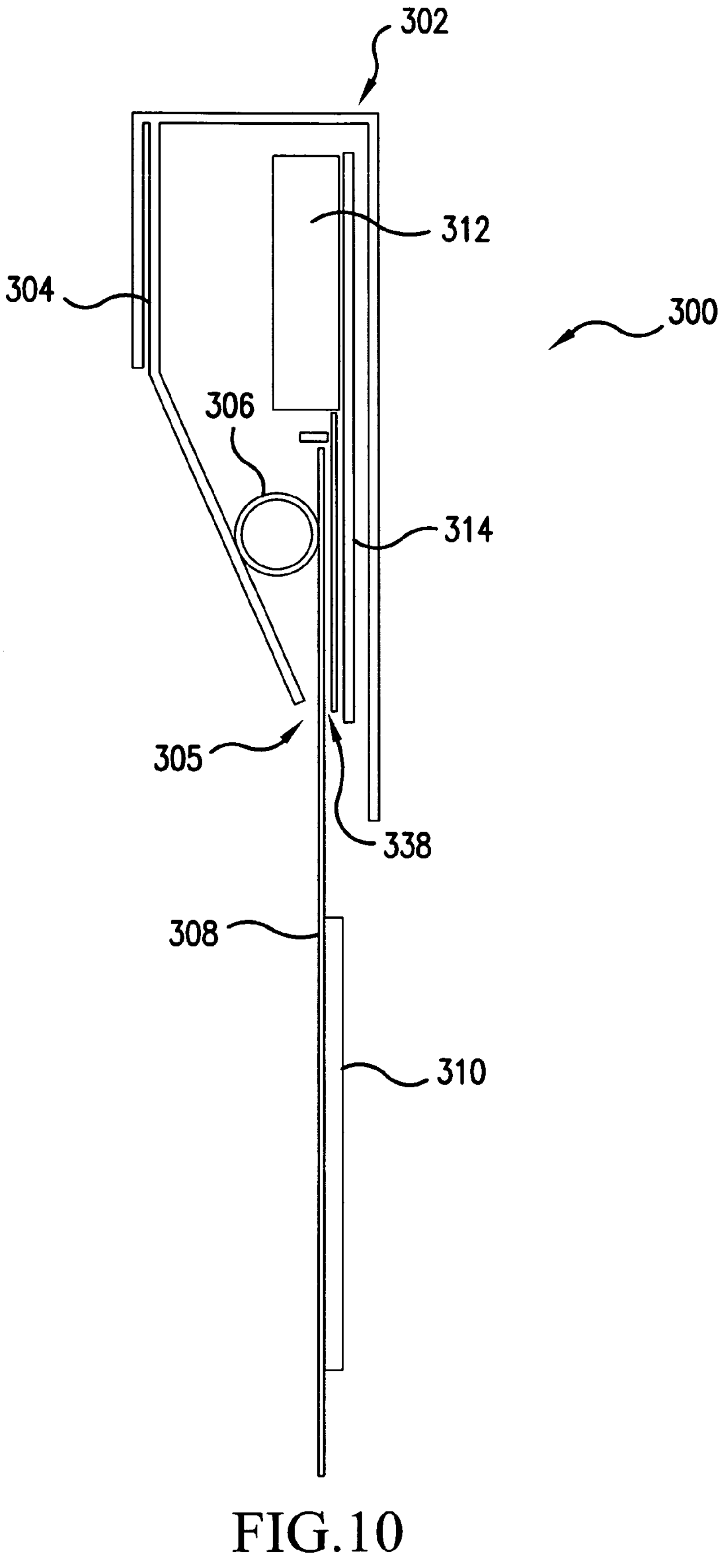
FIG. 10 is a schematic of a display and poster holder according to a third exemplary embodiment.

FIG. 10 shows a third exemplary embodiment of a display 300 and a corresponding poster holder 302. Generally, the same components are provided as set forth above in the first two embodiments, with the exception of the configuration of the first and second members 304, 306. In particular, the first member 304 is a substantially rigid structure that defines an opening 305, while the second member 306 is a cylindrical shaped member that is moveable away from the opening 305 to an open position and moveable towards the opening 305 to a closed position. It is understood that the cylindrical shaped member could also be spherical shaped or replaced with a pneumatic member.

In addition, for this particular configuration, the controller 312 and the circuit board 318 is supported by the first member 304. The plurality of contacts 338 attached to circuit board 314 cooperates with a self-illuminable image 310 formed on the substrate 308 when the second member 306 is in the closed position. In order to connect the self-illuminable image to the contacts 338, the substrate is inserted into opening 305 to push the second member 306 away from the opening. Once the force of insertion is removed from the substrate 308, gravity pulls the second member 306 back towards the opening 305, thereby securing the substrate 308 between the first and second members 304, 306. It is possible to use a spring or other biasing member to supplement or replace the effects of gravity.

Figure 11:
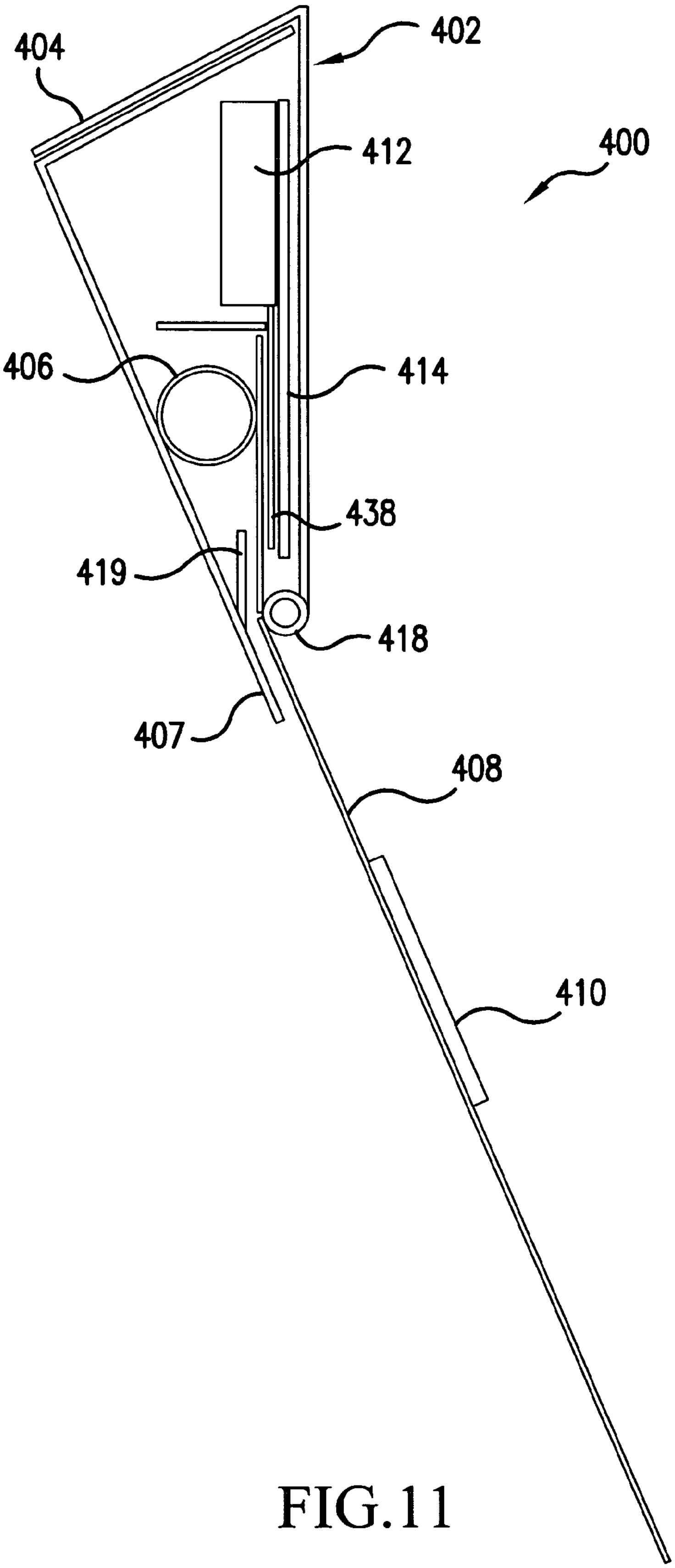
FIG. 11 is a schematic of a display and poster holder according to a fourth exemplary embodiment.

FIG. 11 shows a display 400 and corresponding poster holder 402 that is very similar to the poster holder 302. The main differences are the inclusion of member 418 that is attached to the first member 404 that cooperates with a freely extending member 419 formed internal to the first member 404, and an extension 407 of the first member 404 to assist in supporting the substrate 408. The controller 412, circuit board 414, and contacts 438 cooperate with a self-illumniable image 410 formed on the substrate 408 as described for the previous embodiments.

It should also be noted that the above described sensor and uses for the first exemplary combination are equally applicable to the second and third exemplary embodiments. In addition the various biasing mechanisms, retaining mechanisms, and locking mechanisms can also be incorporated where it is desired to do so.

There are many advantages to the exemplary displays and poster holders describe above. For example, when it is desired to change a display, the second member is merely pivoted open or slid upwards and the old substrate is removed. A new substrate can then be quickly and easily inserted into the poster holder. Alternatively, a stack of substrates can be sequentially provided, almost like a notepad of substrates for different displays. The controller could illuminate all displays in the stack, but since the top flexible substrate would not be transparent, only the top display would be visible. This top display could then be ripped from the poster holder such that the next underlying display would be shown. Therefore, a pad of paper effect could be had whereby different illuminable displays are possible. Preferably, in such a pad of flexible substrates, perforations proximate to one edge could be provided in order to enhance tearing of the sequential sheets.

While the substrate has been generally described as being flexible, the present poster holders could also be applicable for use with a rigid or inflexible display or with displays of different technologies for energizeable images, either self-illuminable or reflective. While the term poster has been used, it is understood that any substrate having a electronically controllable image or device formed thereon is controllable by the described poster holders. Applications range from point-of-sale displays and one-page posters to complex, multi-page electronic tablet or book arrangements. Furthermore, the self-illuminable image can also be formed as x-y plane pixel matrices that can be altered to change the displayed image. Although the previous descriptions referenced alternating electrical current for electroluminescent displays, it is understood that direct electrical current would apply for other types of electronically controlled displays.

As is explained in U.S. patent application Ser. No. 11/346,180, the electrical power source for the display can also be mounted on the substrate itself. Also, the controller for controlling the illumination of the display can be printed on, mounted on, or embedded within the substrate.

The poster holders are configured to work equally well for portable and stationary displays. The substrate can be freely hanging from a wall or ceiling, or can lie on a flat surface. Other mounting arrangements are also possible. In addition, depending on the location of the display, one or both sides of the substrate can have an illuminatable image that is powered and or controlled through the poster holder.

While some of the exemplary poster holders are described as being closed via a spring assembly, magnetic attraction, bolt and nut assemblies, wedged designs, or pneumatic (balloon) designs may also be used to hold the second member in the closed position.

The poster holders described above are configured to secure at least one poster in the closed position and to subsequently release the poster in the open position, preferably, without altering or degrading the function or physical features of the poster.

Finally, apart from posters, it would be possible to use the poster holder for a vertical backdrop. For example, a curtain, window treatment, room divider or other large display could be powered and/or controlled by the poster holder. Game boards also are another example. Such game boards typically lie on a flat horizontal surface and may be powered by a controller in the attached poster holder. The device can bear any or all of the features described above and might also allow for interactive sequencing when switches are triggered such switches as on the game board itself. Great flexibility can be had with the reusable poster holder of the present invention.

The invention thus being described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A display comprising:

at least one poster including:

a substrate; and at least one energizeable image formed on the substrate; and a poster holder including:

a first member;

a second member moveable away from the first member to an open position and moveable towards the first member to a closed position, the second member cooperating with the first member to secure the at least one poster in the closed position, the at least one poster being readily insertable and removable from the poster holder;

a controller configured to selectively energize and thereby illuminate at least one portion of the at least one energizeable image after the at least one poster is secured between the first member and the second member by supplying an electrical current to the at least one portion of the at least one energizeable image; and an electrical power source connected to the controller.

2. The display according to claim 1, wherein the poster holder includes a circuit board supported by the second member, the circuit board being in communication with the controller to selectively energize and thereby illuminate the at least one portion of the at least one energizeable image, the at least one portion of the at least one image emitting illumination.

3. The display according to claim 2, further comprising a cushion member disposed on the first member, the cushion member assisting in holding the at least one poster between the first and second member.

4. The display according to claim 1, wherein the at least one poster is replaceable with another poster having at least one energizeable image thereon, the first and second members being pivoted away from and toward one another during replacement of the at least one poster.

5. The display according to claim 4, wherein the at least one poster includes a plurality of posters that are removable from the poster holder.

6. The display according to claim 1, further comprising a locking mechanism to lock the at least one poster in the display.

7. The display according to claim 6, wherein the locking mechanism includes a pair of spaced apart fasteners that penetrate the second member and the at least one poster, the at least one poster including a pair of spaced apart holes that correspond to the spaced apart fasteners.

8. The display according to claim 1, wherein the first member includes a first portion and a second portion, the first portion is covered by the second member in the closed position, and the second portion supports a portion of the at least one poster.

9. The display according to claim 8, wherein the first member includes a bent portion between the first and second portion causing the second portion to be elevated with respect to the first portion.

10. The display according to claim 1, further comprising a power interrupt device configured to interrupt flow of electricity to the energizeable image when the second member is moved out of the closed position.

11. The display according to claim 10, wherein the power interrupt device includes a switch that is opened when the second member is moved out of the closed position, the switch being located between the electrical power source and the controller or downstream from the controller.

12. The display according to claim 1, wherein the poster holder is a frame with the first member being a back of the frame and the second member being a face of the frame, the face of the frame having an opening therein.

13. The display according to claim 1, wherein the controller receives instructions for selectively energizing at least one portion of the at least one energizeable image on the substrate from a program stored in a memory device, data entered via a keypad connected to the controller, a reader that reads instructions from an integrated chip that is separate or attachable to a substrate, a reader that reads instructions from a code imprinted on the substrate, or via a direct or wireless connection to a computer.

14. The display according to claim 1, wherein the controller selectively energizes at least one portion of the energizeable image based on signals from a sensor, the sensor including at least one of a thermometer for detecting temperature, an ambient light detector, a detector for sensing location, a noise detector for detecting sound, an infrared sensor, a vibration sensor, a timer, a switch, and a radio wave, acoustic, or other proximity sensor.

15. The display according to claim 1, wherein the first member defines an enclosure with an opening and the second member is a cylindrical member that is moveable away from the opening to the open position and moveable towards the opening to the closed position.

16. The display according to claim 1, wherein the poster holder is configured to secure the at least one poster in the closed position and to subsequently release the poster in the open position without altering or degrading the function or physical features of the poster.

17. The display according to claim 1, wherein the first and second members pinch the at least one poster to hold the at least one poster in position.

18. The display according to claim 1, wherein the at least one poster has leads on the substrate and wherein the controller has contact which are engageable with the leads when the at least one poster is in the display whereby at least a portion of the at least one image can be selectively energized to self-illuminate.

19. A method for displaying at least one energizeable image on at least one poster, the method comprising:

placing at least one poster having the at least one energizeable image between a first member and a second member of a poster holder;

closing the second member of the poster holder to secure the at least one poster between the first and second members of the poster holder;

providing a controller for the at least one poster, the controller being configured to selectively energize and thereby illuminate at least one portion of the at least one energizeable image; and supplying electricity to the controller, thereafter the controller selectively energizing at least one portion of the at least one energizeable image, the at least one portion of the at least one image thereby emitting illumination.

20. The method according to claim 19, further comprising interrupting flow of electricity to the energizeable image when the second member is not in the closed position.

21. The method according to claim 20, wherein the controller selectively energizes at least one portion of the at least one energizeable image based on a program run by the controller.

22. The method according to claim 19, changing the program run by the controller to selectively energize at least one portion of the at least one energizeable image by providing a different program stored in a memory device, by selecting a different program via a keypad connected to the controller, reading instructions from an integrated chip that is separate or attached to a substrate, reading instructions from a code imprinted on the substrate, or receiving instructions via a direct or wireless connection to a computer.

23. The method according to claim 19, wherein the controller selectively energizes the at least one portion of the energizeable image based on signals from a sensor detecting at least one of temperature, level of ambient lighting, change in location, sound, an infrared signal, vibration, an elapsed period of time, activation of a switch, and activation of a radio wave, acoustic, or other proximity sensor.

* * * * *